(12) United States Patent
Sung (10) Patent No.: US 12,438,666 B2
(45) Date of Patent: Oct. 7, 2025

(54) USER-SPECIFIC DEMODULATION REFERENCE SIGNALS

(71) Applicant: T-Mobile USA, Inc., Bellevue, WA (US)

(72) Inventor: Sanghoon Sung, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 640 days.

(21) Appl. No.: 17/860,186

(22) Filed: Jul. 8, 2022

(65) Prior Publication Data

US 2024/0014970 A1    Jan. 11, 2024

(51) Int. Cl.
*H04L 5/00* (2006.01)
*H04L 1/20* (2006.01)
*H04L 27/26* (2006.01)
*H04W 4/02* (2018.01)

(52) U.S. Cl.
CPC ............ *H04L 5/0051* (2013.01); *H04L 1/203* (2013.01); *H04L 27/2613* (2013.01); *H04W 4/027* (2013.01)

(58) Field of Classification Search
CPC ... H04L 5/0051; H04L 1/203; H04L 27/2613; H04L 5/0058; H04L 5/0085; H04L 27/2655; H04L 27/26885; H04L 27/2695; H04L 25/0222; H04L 25/0226; H04L 27/26134; H04L 27/2646; H04W 4/027
See application file for complete search history.

(56) References Cited

U.S. PATENT DOCUMENTS

| | | |
|---|---|---|
| 8,155,045 B2 | 4/2012 | Sherman et al. |
| 8,259,637 B2 | 9/2012 | Bertrand et al. |
| 9,119,036 B2 | 8/2015 | Kazmi et al. |
| 9,154,352 B2 | 10/2015 | Palanki et al. |
| 9,491,575 B2 | 11/2016 | Edge et al. |
| 9,742,535 B2 | 8/2017 | Lorca Hernando |
| 9,900,216 B2 | 2/2018 | Eriksson et al. |
| 10,187,928 B2 | 1/2019 | Karandikar et al. |

(Continued)

FOREIGN PATENT DOCUMENTS

| | | |
|---|---|---|
| CN | 1951027 A | 4/2007 |
| CN | 102405627 B | 11/2015 |

(Continued)

*Primary Examiner* — Kiet Tang
(74) *Attorney, Agent, or Firm* — Perkins Coie LLP (57) ABSTRACT

A user equipment (UE) device generates a first channel estimate for a physical telecommunications channel based on a first demodulation reference signal (DMRS) received at the UE. The first DMRS has a format that includes a signal at a first number of symbol positions of an orthogonal frequency-division multiplexing (OFDM) scheme. A data transmission received at the UE is demodulated based at least in part on the first channel estimate. When the UE detects a condition trigger to change a format of the DMRS to have a second number of symbol positions, the UE requests, from a network access node (NAN), a DMRS format with the second number of symbol positions. Subsequent data transmissions are demodulated based at least in part on a second channel estimate for the physical telecommunications channel that is generated using a DMRS transmitted at the second number of symbol positions.

20 Claims, 10 Drawing Sheets

(56) References Cited

U.S. PATENT DOCUMENTS

| | | | |
|---|---|---|---|
| 10,630,410 B2 | 4/2020 | Parkvall et al. | |
| 11,197,050 B2 | 12/2021 | Gunasekara et al. | |
| 2004/0023678 A1 | 2/2004 | Fredriksson | |
| 2004/0202142 A1* | 10/2004 | Batariere | H04L 27/2647 370/342 |
| 2009/0201860 A1 | 8/2009 | Sherman et al. | |
| 2010/0054161 A1 | 3/2010 | Montojo et al. | |
| 2010/0067482 A1 | 3/2010 | Vikberg et al. | |
| 2010/0265842 A1 | 10/2010 | Gorokhov et al. | |
| 2010/0265874 A1 | 10/2010 | Palanki et al. | |
| 2011/0230144 A1 | 9/2011 | Siomina et al. | |
| 2012/0057566 A1 | 3/2012 | Ahmadi | |
| 2012/0184290 A1 | 7/2012 | Kazmi et al. | |
| 2013/0308564 A1 | 11/2013 | Jain et al. | |
| 2014/0094188 A1 | 4/2014 | Kazmi et al. | |
| 2015/0365790 A1 | 12/2015 | Edge et al. | |
| 2015/0381422 A1 | 12/2015 | Eriksson et al. | |
| 2016/0211959 A1* | 7/2016 | Jöngren | H04W 24/08 |
| 2017/0331577 A1 | 11/2017 | Parkvall et al. | |
| 2019/0285722 A1 | 9/2019 | Markhovsky et al. | |
| 2020/0106581 A1* | 4/2020 | Nammi | H04L 5/0085 |
| 2023/0096382 A1* | 3/2023 | Levitsky | H04B 7/01 370/329 |

FOREIGN PATENT DOCUMENTS

| | | |
|---|---|---|
| CN | 107409348 B | 11/2020 |
| CN | 113508625 A | 10/2021 |
| CN | 113615109 A | 11/2021 |
| DE | 112019002752 T5 | 4/2021 |
| EP | 2422501 A2 | 2/2012 |
| EP | 2666319 A1 | 11/2013 |
| EP | 3097734 A2 | 11/2016 |
| EP | 3443704 A2 | 2/2019 |
| JP | 2014503163 A | 2/2014 |
| JP | 2015208022 A | 11/2015 |
| JP | 2018511989 A | 4/2018 |
| JP | 6496037 B2 | 3/2019 |
| JP | 2020511879 A | 4/2020 |
| KR | 20120023004 A | 3/2012 |
| KR | 20140040273 A | 4/2014 |
| KR | 101540989 B1 | 7/2015 |
| KR | 20150136616 A | 12/2015 |
| KR | 20190010863 A | 1/2019 |
| WO | 2015112071 A2 | 7/2015 |
| WO | 2015155411 A1 | 10/2015 |
| WO | 2017196246 A2 | 11/2017 |
| WO | 2019049110 A1 | 3/2019 |
| WO | 2020204786 A1 | 10/2020 |

* cited by examiner

USER-SPECIFIC DEMODULATION REFERENCE SIGNALS

BACKGROUND

Wireless devices communicate on telecommunications networks by receiving and transmitting modulated signals via a network access node (NAN). When data is wirelessly transmitted between a wireless device and a NAN, a demodulation reference signal (DMRS) can be sent with at least some of the data transmissions. A DMRS is a signal used by a receiver to estimate properties of the physical channel between a transmitter and receiver, facilitating demodulation of the signals transmitted over the physical channel.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A wireless device and a network access node (NAN) transmit data over a physical channel by modulating carrier signals with the data to be transmitted. Such modulated transmissions can be multiplexed by a scheme such as orthogonal frequency division multiplexing (OFDM). Included within at least some data transmissions between the wireless device and NAN is a demodulation reference signal (DMRS), which is a known signal that is usable by a receiver to estimate properties of the physical channel. The DMRS can be transmitted at one, two, three, or four OFDM symbols. In a conventional DMRS configuration, the number of DMRS positions is a fixed network setting. For example, each time a receiver requests the DMRS, the transmitter transmits the same number of positions of the DMRS. However, conditions that affect the ability of a receiver to accurately demodulate signals based on the DMRS can vary over time. These variable conditions can result in a need for additional DMRS positions under some circumstances to enable the receiver to accurately estimate channel properties. On the other hand, transmitting more positions of the DMRS than are necessary to accurately estimate channel properties results in unnecessarily occupying resource elements with the DMRS instead of using them to transmit user data. To address these and other problems, the inventors have conceived of and reduced to practice variable-position DMRS signals, where the number of DMRS positions is varied based on one or more conditions measured by the wireless device and/or the NAN. The resulting DMRS format, which can be individualized to a particular wireless device in communication with a NAN, enables channel properties to be accurately estimated without unnecessarily reducing throughout available for user data.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
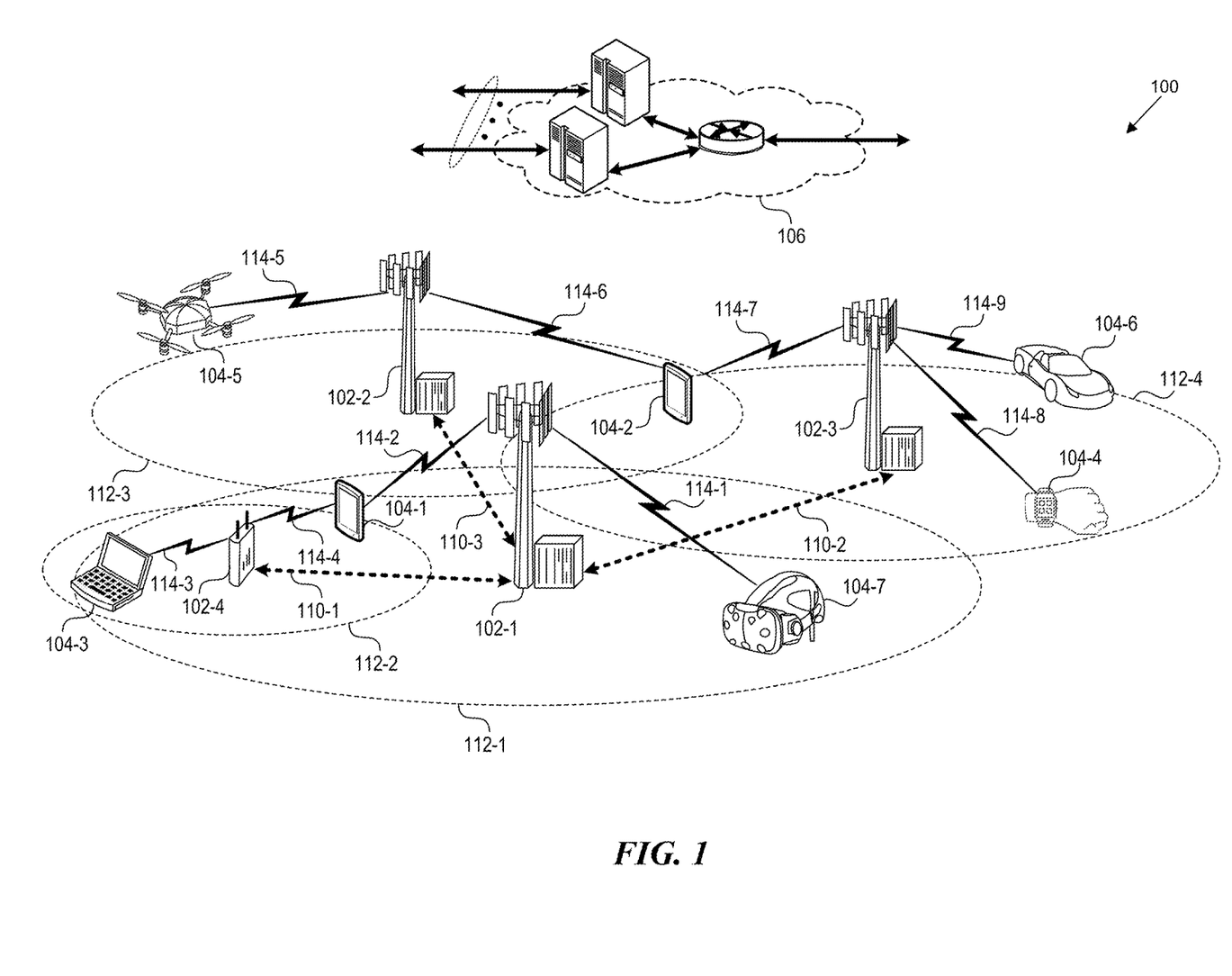
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, a mobile device, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
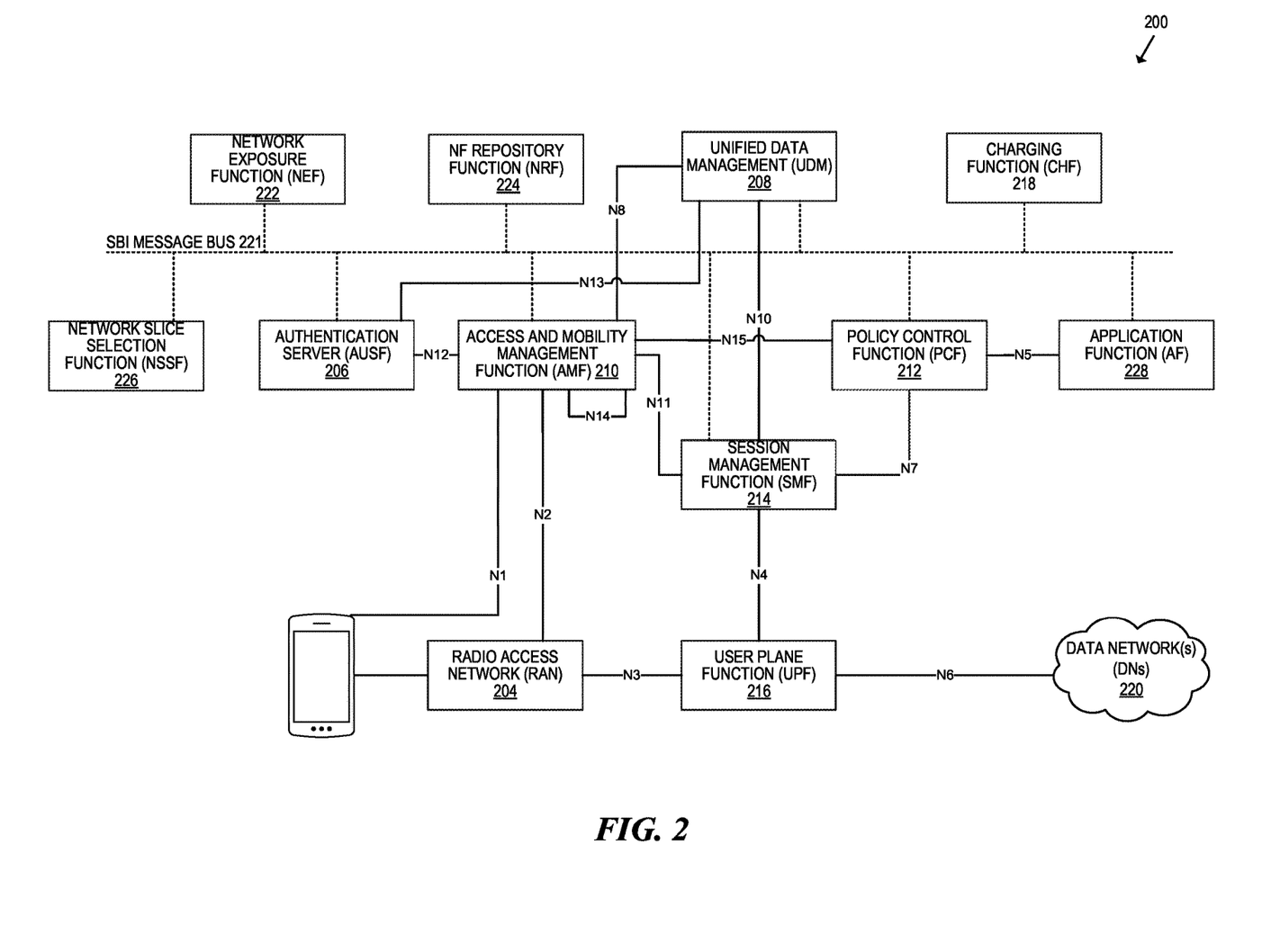
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

User-Specific Demodulation Reference Signals

Figure 3:
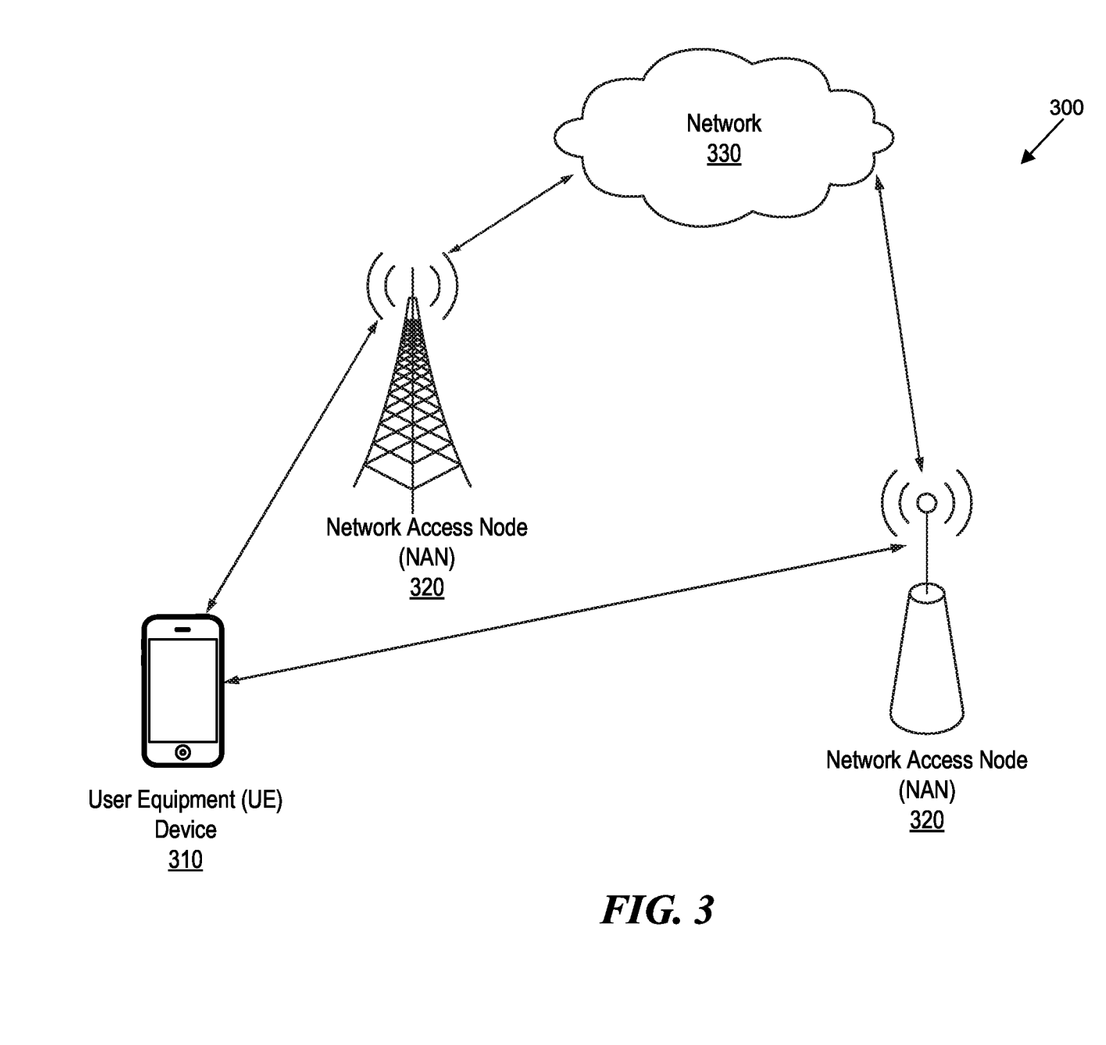
FIG. 3 is a block diagram illustrating an environment in which a user equipment (UE) device communicates with a NAN in order to transmit data across and receive data from a telecommunications network, according to some implementations.

Wireless devices communicate on telecommunications networks like the network 100 by receiving and transmitting modulated signals via a network access node (NAN) such as a gNodeB. FIG. 3 is a block diagram illustrating an example environment 300 in which a user equipment (UE) device 310 communicates with a NAN 320 in order to transmit data across and receive data from a telecommunications network 330. The telecommunications network 330 can be implemented in a manner similar to the network 100 described with respect to FIG. 1.

In general, communications between the NAN 320 and the UE 310 are facilitated across different types of channels, including a physical downlink shared channel (PDSCH), which carries user data from the NAN 320 to the UE 310, and a physical uplink shared channel (PUSCH), which carries user data from the UE 310 to the NAN 320. Data can be transmitted on the PDSCH and PUSCH using orthogonal frequency-division multiplexing (OFDM), in which multiple orthogonal subcarrier signals are modulated using any of a variety of types of modulation schemes.

A demodulation reference signal (DMRS) is used by a receiver to produce channel estimates for demodulation of signals transmitted over a physical channel. For example, the UE 310 uses a DMRS sent by the NAN 320 to estimate properties of the physical channel for demodulation of a data transmission received from the NAN 320, while the NAN 320 uses a DMRS sent by the UE 310 to estimate the properties of the physical channel for demodulation of a data transmission received from the UE 310. The DMRS is a known reference signal, such that the signal that is received by a receiver can be compared against the known reference signal to derive properties of the physical channel such as frequency response properties, phase shift properties, or noise properties. The DMRS is transmitted on demand when requested by a receiver. When transmitted, the DMRS can be transmitted at one or more "positions," each corresponding to a time-domain OFDM symbol.

The UE 310 can be any type of wireless device capable of receiving and transmitting data over a telecommunications network. For example, the UE 310 can be any of the wireless devices 104-1 through 104-7 described with respect to FIG. 1. The UE 310 sends and receives data over the telecommunications network by transmitting modulated communications to the NAN 320 and demodulating communications received from the NAN 320.

The UE 310 measures properties of signals transmitted between the UE and the NAN 320. For example, the UE 310 can measure signal power (e.g., as reference signal received power (RSRP), a signal-to-interference-plus-noise ratio (SINR), or bit error rate. The UE 310 can further include one or more sensors that are configured to output respective signals indicative of a velocity of the device. For example, the UE 310 can include a global positioning sensor, an inertial measurement unit, or other types of sensors that produce signals, alone or in combination, that can be processed to determine (a) if the UE 310 is moving, and (b) if so, what its velocity of movement is. The signal properties or device velocity can be monitored by the UE 310 to determine when to request a DMRS format change.

FIGS. 4A-4D illustrate example slots 410 in a 5G-NR frame structure with differing DMRS formats. Each slot 410 represents a portion of a data frame transmitted between the UE 310 and the NAN 320. For example, a frame has a duration of 10 ms and is divided into ten, 1 ms subframes. Each subframe is further divided into 1, 2, 8, or 16 slots, depending on carrier frequency. Each slot has fourteen OFDM symbols 412. Finally, a resource block at each OFDM symbol has twelve subcarriers 414 in the frequency domain.

Figure 4A:
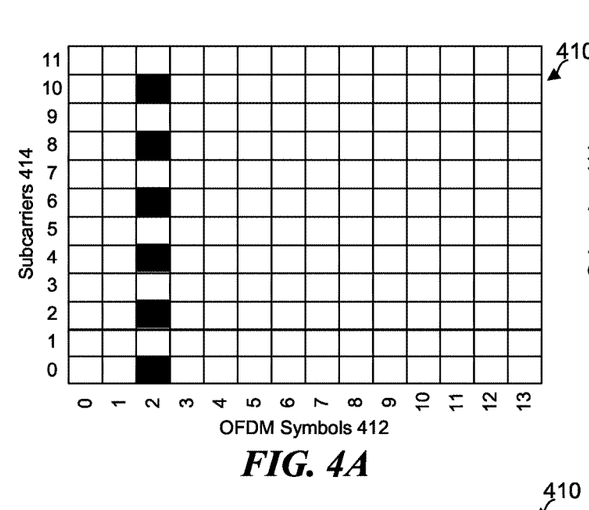
FIGS. 4A-4D illustrate example demodulation reference signal (DMRS) formats.
Figures 4B, 4D:
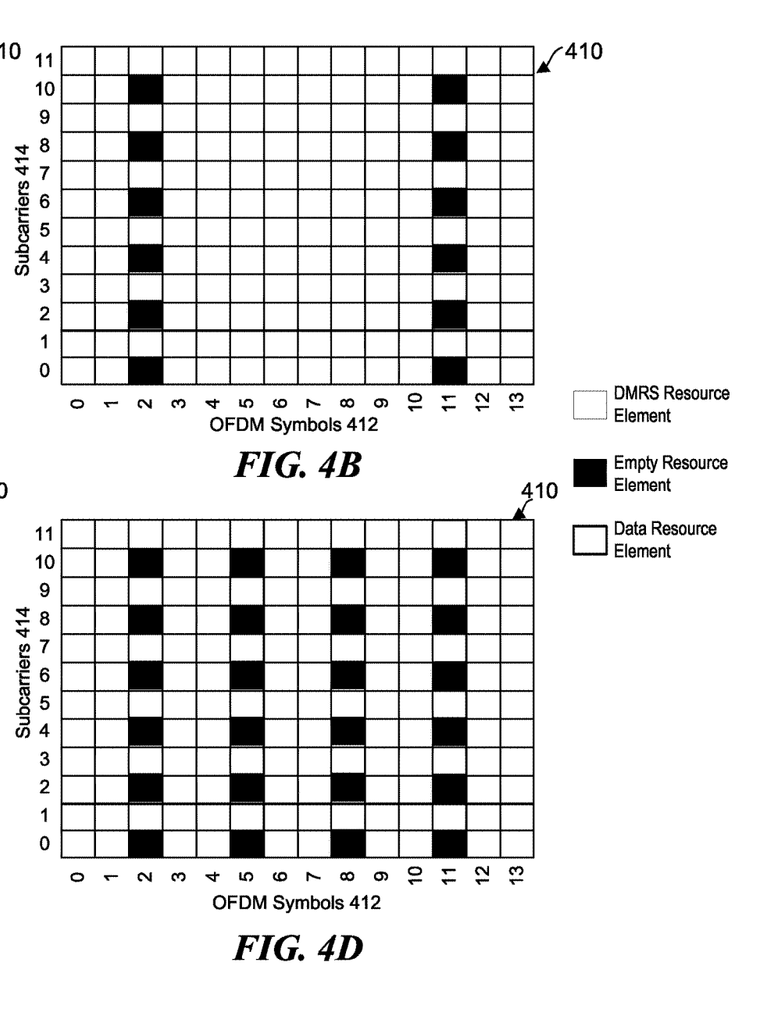
Figure 4C:
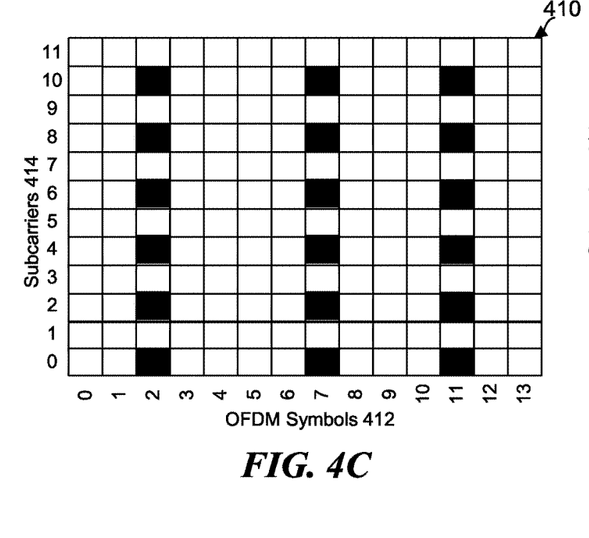

During communications between the UE 310 and the NAN 320, a DMRS is transmitted to a respective receiver at one or more positions, where each position corresponds to one of the 14 OFDM symbols in the slot 410. FIG. 4A illustrates one DMRS position (at OFDM symbol 2), FIG. 4B illustrates two positions (at OFDM symbols 2 and 11), FIG. 4C illustrates three positions (at OFDM symbols 2, 7, and 11), and FIG. 4D illustrates four positions (at OFDM symbols 2, 5, 8, and 11). The receiver evaluates properties of the physical channel by interpolating the properties derived from the DMRS across time and frequency domains.

In a conventional DMRS configuration, the number of DMRS positions is a fixed network setting. For example, each time a receiver requests the DMRS, the transmitter transmits the same number of positions of the DMRS. In contrast, implementations of the NAN 320 and UE 310 described herein vary the number of DMRS positions based on one or more condition triggers. The condition triggers examined by the UE 310 and/or the NAN 320 relate to conditions that may impact the transmission of data between the UE 310 and the NAN 320. One example such condition is velocity of the UE 310. For example, if the UE 310 is located in a moving vehicle, properties of the wireless connection between the device 310 and a NAN 320 will likely change more quickly than it would if the device 310 were stationary. Other such example conditions include a downlink or uplink bit error rate, signal strength, or SINR on the channel. When bit error rate is high or signal strength or SINR is low, a receiver may not be able to accurately estimate the properties of the physical channel using a single-position DMRS. On the other hand, transmitting more positions of the DMRS than are necessary to accurately estimate channel properties results in unnecessarily occupying resource elements with the DMRS instead of using them to transmit user data. Thus, by dynamically varying the number of DMRS positions based on a condition trigger, the UE 310 and NAN 320 can use a DMRS format that is sufficient to generate an accurate channel estimate under current conditions, without unnecessarily reducing throughput for user data.

Figure 5A:
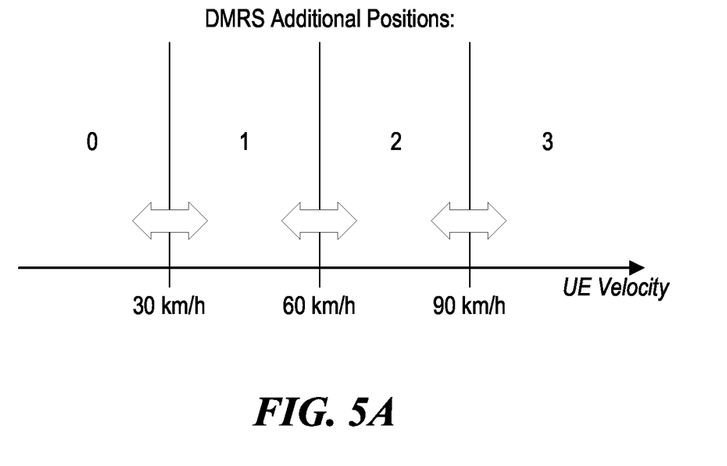
FIGS. 5A-5B illustrate example condition triggers for modifying a DMRS format.

FIG. 5A illustrates an example set of condition triggers related to velocity of the UE 310. In the example of FIG. 5A, condition triggers are set at velocities of 30 km/h, 60 km/h, and 90 km/h. If the UE 310 has a velocity below 30 km/h, zero additional DMRS positions are allocated (i.e., the UE 310 and NAN 320 use a single-position DMRS). When the velocity of the UE 310 increases to a value between 30 km/h and 60 km/h, the device requests one additional DMRS position. Similarly, the electronic device requests two additional DMRS positions when the velocity is above 60 km/r and below 90 km/r, and three additional positions when the velocity is above 90 km/h.

Figure 5B:
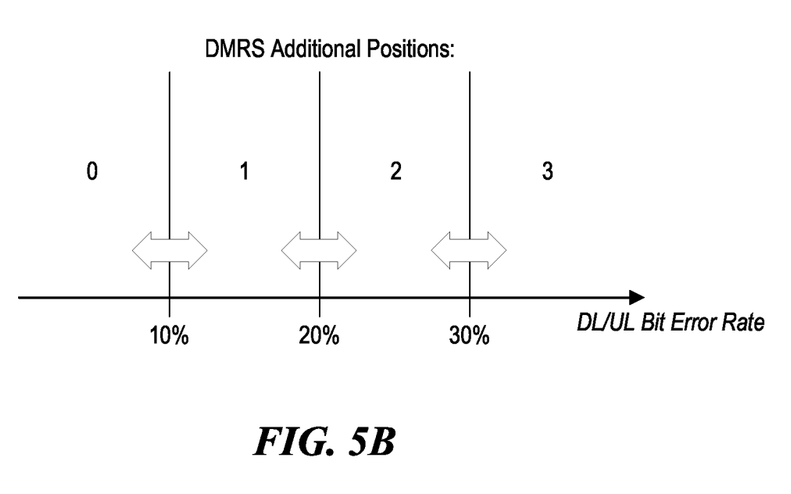

FIG. 5B illustrates an example set of condition triggers related to bit error rate measured by the UE 310 or the NAN 320. In the example of FIG. 5B, condition triggers are set at bit error rates of 10%, 20%, and 30%. Zero additional DMRS positions are used when the bit error rate is below 10%, one additional position is used when the bit error rate is between 10% and 20%, two additional positions are used when the bit error rate is between 20% and 30%, and three additional positions are used when the bit error rate is above 30%.

The values of the condition triggers shown in FIGS. 5A-5B can be set to any of a variety of other values, for example to take into account factors such as variations in the expected range of values of the corresponding positions, properties of the physical channel, or quantity of data to be transmitted over the channel. The condition triggers can be approximately evenly spaced values, as shown for example in FIGS. 5A-5B, or unevenly spaced values. Furthermore, the UE 310 and NAN 320 can use different numbers of condition triggers when determining a DMRS format, and can select different numbers of positions for the DMRS signal. In an example, the UE 310 and NAN 320 use a single condition trigger to vary the number of DMRS positions between one position and four positions or two positions and three positions. Another example alternatively UE 310 and NAN 320 use one condition trigger to determine whether to request one DMRS position or two, and another condition trigger to determine whether to request two DMRS positions or four.

When applying the example condition triggers illustrated in FIG. 5A-5B, some implementations of the UE 310 use a smoothing technique to reduce a number of requests to change the DMRS format when a monitored condition is near a corresponding condition trigger. In some implementations, hysteresis techniques are used to smooth changes between DMRS formats. For example, referring to the bit error rate triggers shown in FIG. 5B, the UE 310 can apply a 2% hysteresis. If, for example, the measured bit error rate increases from below 10% to above 10%, the UE 310 does not request another DMRS position until a bit error rate above 12% has been measured. Similarly, if the bit error rate falls from above 30% to below 30%, the UE 310 does not request a reduced number of additional DMRS positions until the bit error rate falls below 28%. Other implementations of the UE and NAN use a timer to reduce the number of DMRS format changes. In an example, referring to the velocity triggers shown in FIG. 5A, the UE 310 can start a timer when the velocity reduces from 65 km/h to 58 km/h. If the average velocity measured during the timer period is below 60 km/h, the UE 310 requests one additional DMRS position instead of two. In another example, the UE 310 starts a timer when the velocity increases above 30 km/h and requests the number of DMRS positions applicable to the velocity measured when the timer expires (e.g., by requesting three additional positions if the final velocity is 92 km/h, without creating intermediate requests for one and two additional positions as the velocity increases). In still another implementation, the UE 310 requests a format change to, for example, a four-position DMRS at the time the device's velocity increases above the 90 km/h threshold, but does not request a format change to a three-position DMRS when the velocity falls below the 90 km/h threshold until the next time the device needs to request the DMRS. Similar techniques can be applied by the NAN 320 when the condition triggers for DMRS format changes are monitored by the NAN.

Figure 6A:
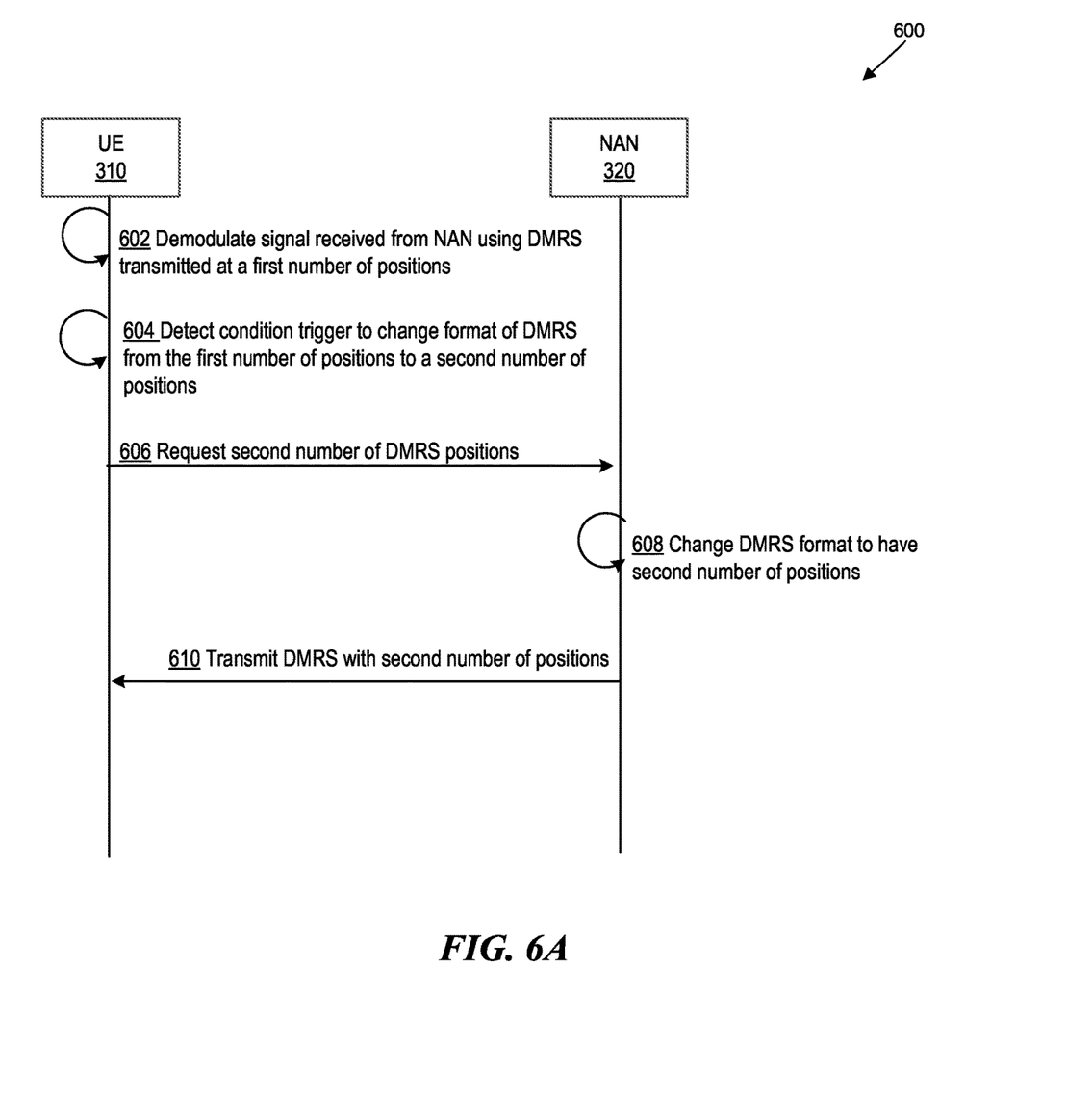
FIG. 6A is an interaction diagram that illustrates a process for dynamically allocating DMRS positions based on condition triggers, according to some implementations.

FIG. 6A is an interaction diagram that illustrates a process 600 for dynamically allocating DMRS positions based on condition triggers, according to some implementations. In FIG. 6A, the condition trigger is detected by the UE 310, and relates to a condition that is measurable by the UE (such as velocity of the UE, bit error rate, or downlink signal strength or SINR).

At block 602, the UE 310 demodulates signals received from the NAN 320 based at least in part on a first channel estimate generated using a DMRS. The DMRS used to generate the first channel estimate has a first format, with a first number of positions of the reference signal.

At block 604, the UE 310 detects a condition trigger to change the format of the DMRS from the first format to a second format, in which the DMRS is transmitted at a second number of positions. For example, the UE 310 may detect an increase in a value of a condition that is likely to make accurate channel estimation more difficult using a DMRS with the first number of positions, and thus it may be desirable for the UE to request additional DMRS positions. In another example, the UE 310 may detect a decrease in a value of the condition, as a result of which the channel properties can be estimated more accurately with fewer DMRS positions.

At block 606, the UE 310 transmits a message to the NAN 320 to request a DMRS format change to the second number of positions. The NAN correspondingly changes the DMRS format at block 608.

At block 610, the NAN 320 transmits the DMRS to the UE 310, with the second number of positions. The new DMRS can be transmitted in response to the request to change the DMRS format (e.g., in a next data transmission following processing of the request at the NAN). Alternatively, the new DMRS can be transmitted in response to the next request by the UE 310 for the DMRS, which may or may not be the next data transmission to the UE.

Figure 6B:
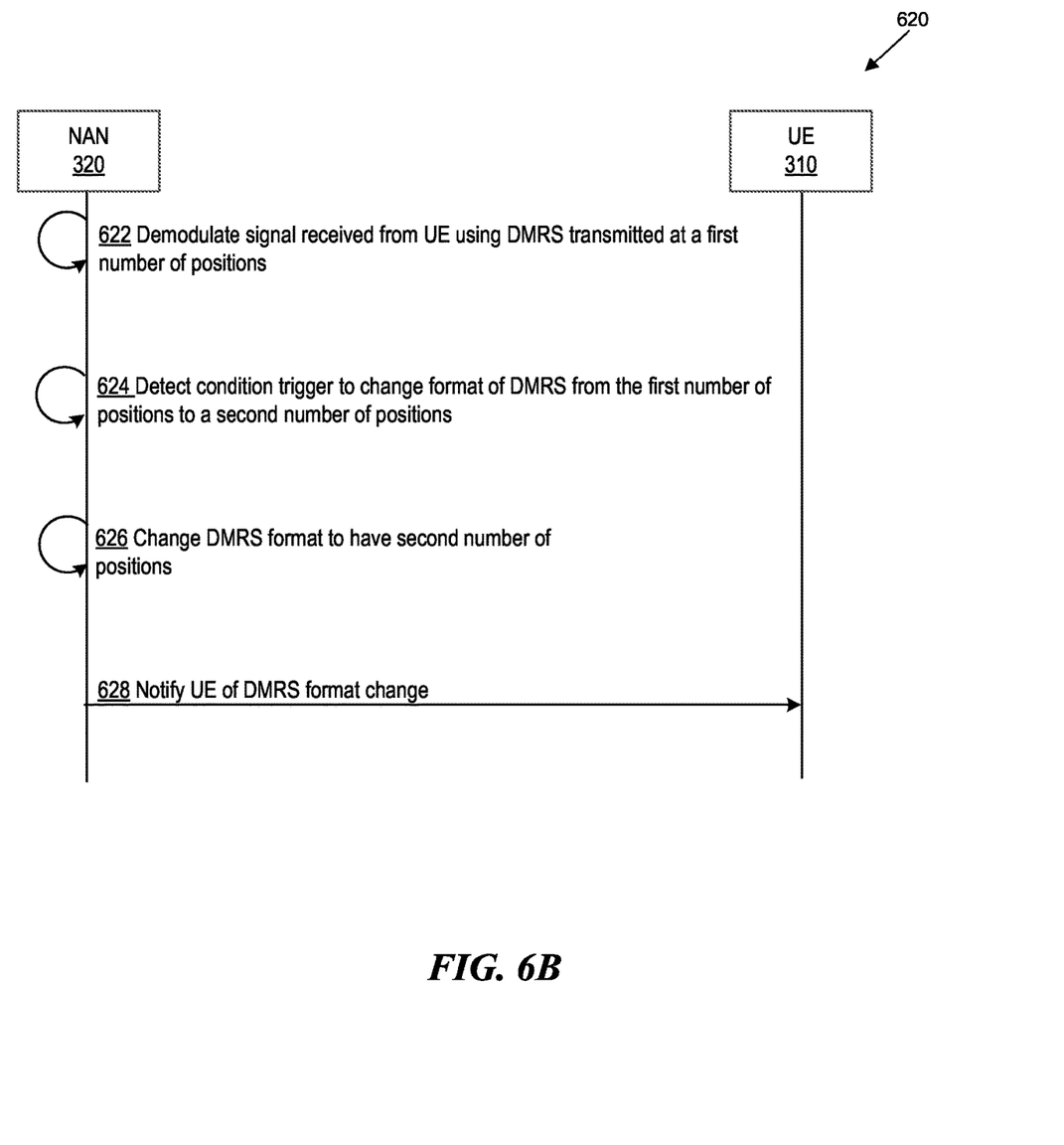
FIG. 6B is an interaction diagram that illustrates another process for dynamically allocating DMRS positions, according to some implementations.

FIG. 6B is an interaction diagram that illustrates another process 620 for dynamically allocating DMRS positions, according to some implementations. The process illustrated in FIG. 6B is similar to the process illustrated in FIG. 6A, except the condition trigger is detected by the NAN 320. For example, the process shown in FIG. 6B can be performed when the condition trigger relates to uplink signal strength or SINR.

At block 622, the NAN 320 uses a DMRS received from the UE to demodulate data transmissions received over a physical channel from the UE. The DMRS has a first number of positions, which can be the same number of positions as used by the NAN 320 when transmitting the DMRS to the UE 310.

At block 624, the NAN 320 detects a condition trigger to change the format of the DMRS from having the first number of positions to having a second number of positions. In some implementations, the NAN 320 detects the condition trigger by, for example, detecting that a signal power of transmissions from the UE 310 has crossed a threshold signal power level, or that an SINR of transmissions from the UE 310 has crossed a threshold SINR level. Additionally or alternatively, the NAN 320 can detect the condition trigger by receiving a request from the UE 310 to change the DMRS format.

At block 626, the NAN 320 changes the DMRS format for the UE 310, and notifies the UE of the format change at block 628.

Figure 7:
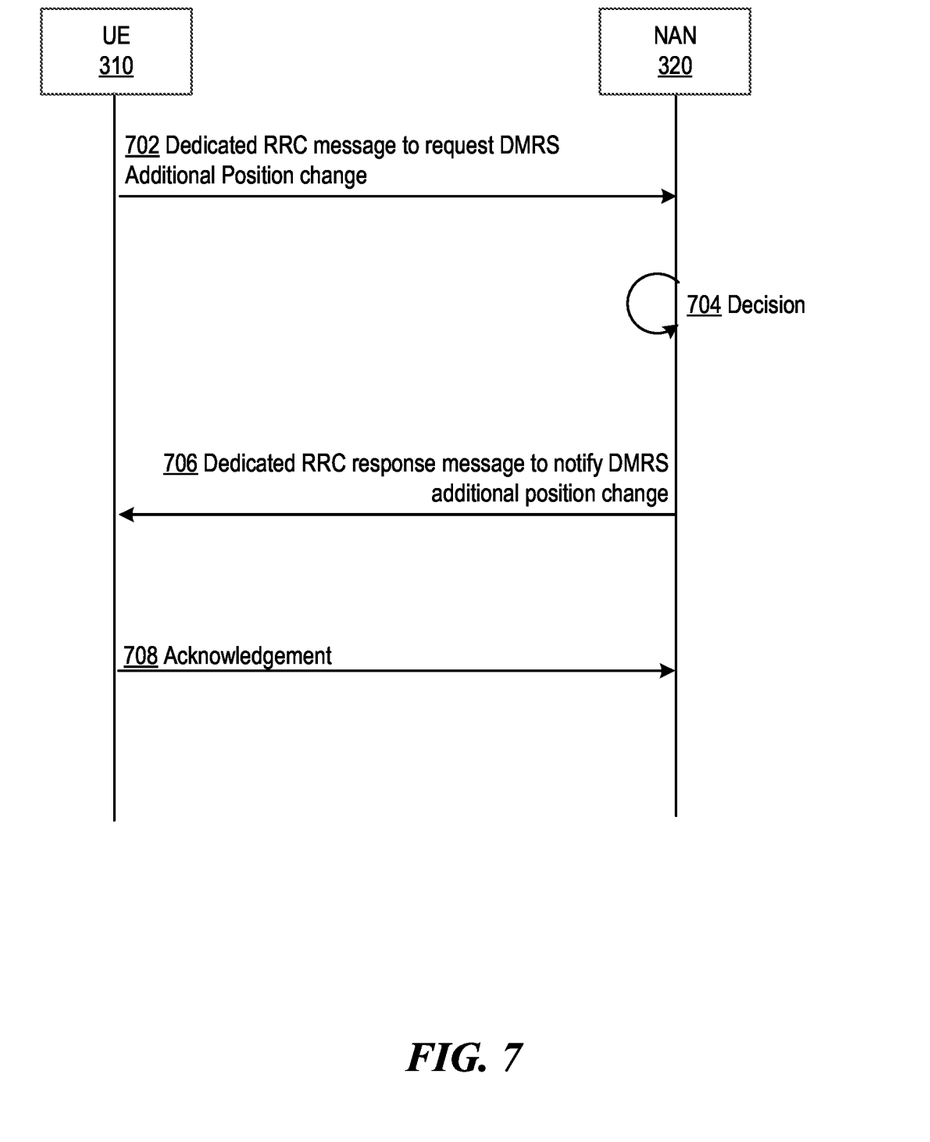
FIG. 7 is an interaction diagram that illustrates dedicated signaling between a NAN and a particular UE that detects a condition trigger, according to some implementations.

FIG. 7 is an interaction diagram that illustrates dedicated signaling between the NAN 320 and the particular UE 310 that detects a condition trigger, as an example implementation of a request and response to change the number of DMRS positions. As shown in FIG. 7, the UE 310 transmits a dedicated radio resource control (RRC) message to the NAN 320 at block 702, requesting a change in the number of additional DMRS positions allocated to the UE. The NAN makes a decision at block 704 and returns a dedicated RRC response message to the UE 310 at block 706 to notify the UE that the request was approved or rejected. The UE 310 returns an acknowledgement message at block 708.

Figure 8A:
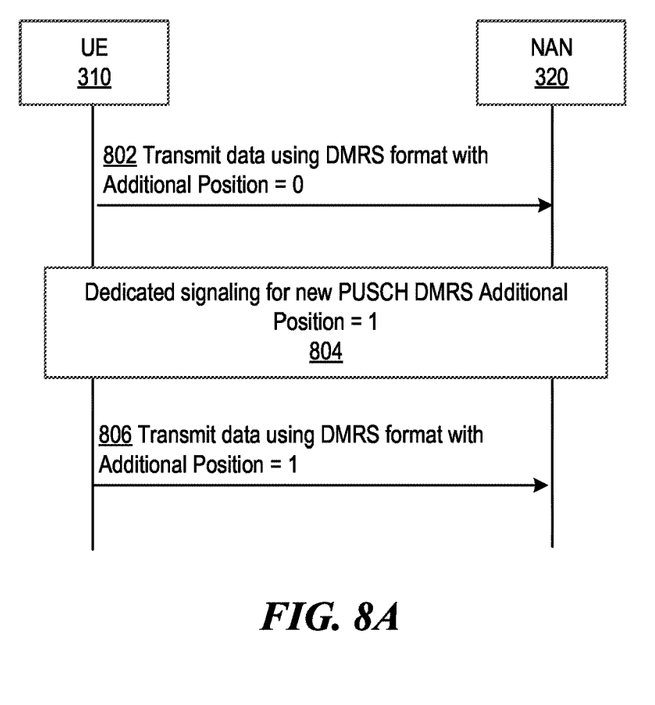
FIGS. 8A-8B are interaction diagrams that illustrate an example transition from a DMRS format with zero additional positions to a format with one additional position.
Figure 8B:
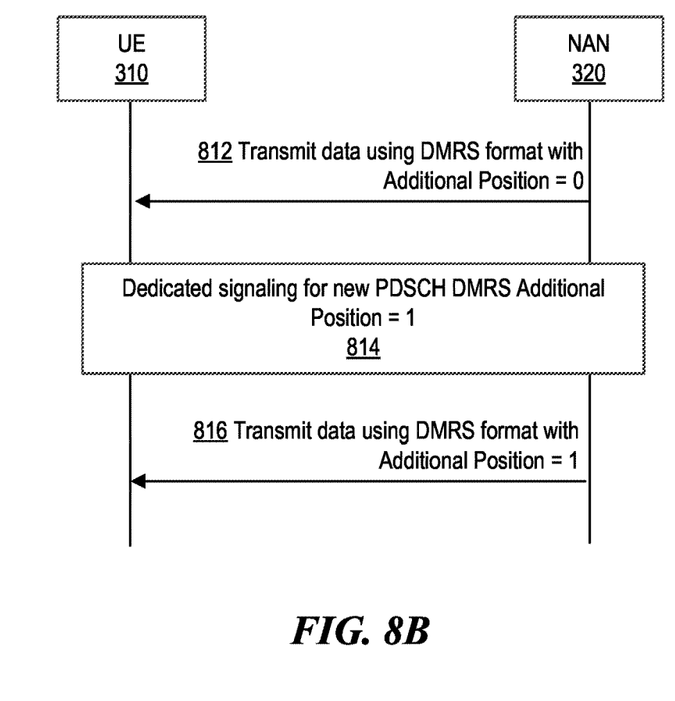

FIGS. 8A-8B are interaction diagrams that illustrate an example transition from a DMRS format with zero additional positions to a format with one additional position. In FIG. 8A, the UE 310 transmits data to the NAN at block 802, using a DMRS format with zero additional positions (i.e., a single-position DMRS). When a condition trigger is detected by either the UE 310 or the NAN 320, dedicated signaling is performed at block 804 to change the DMRS format to include one additional position. The dedicated signaling can be initiated by either the UE 310 or the NAN 320 (e.g., based on the device that detected the condition trigger), and can be performed, for example, according to the process shown in FIG. 7. Once the DMRS position has changed, the UE 310 communicates with the NAN using a DMRS format with one additional position (i.e., a two-position DMRS) at step 806.

In FIG. 8B, similar to FIG. 8A, the NAN 320 transmits data to the UE 310 at block 812, using a DMRS format with zero additional positions. When a condition trigger is detected, dedicated signaling is performed at block 814 to change the DMRS format to include one additional position.

The NAN then communicates with the UE 310, at step 816, using the DMRS format with one additional position.

Computer System

Figure 9:
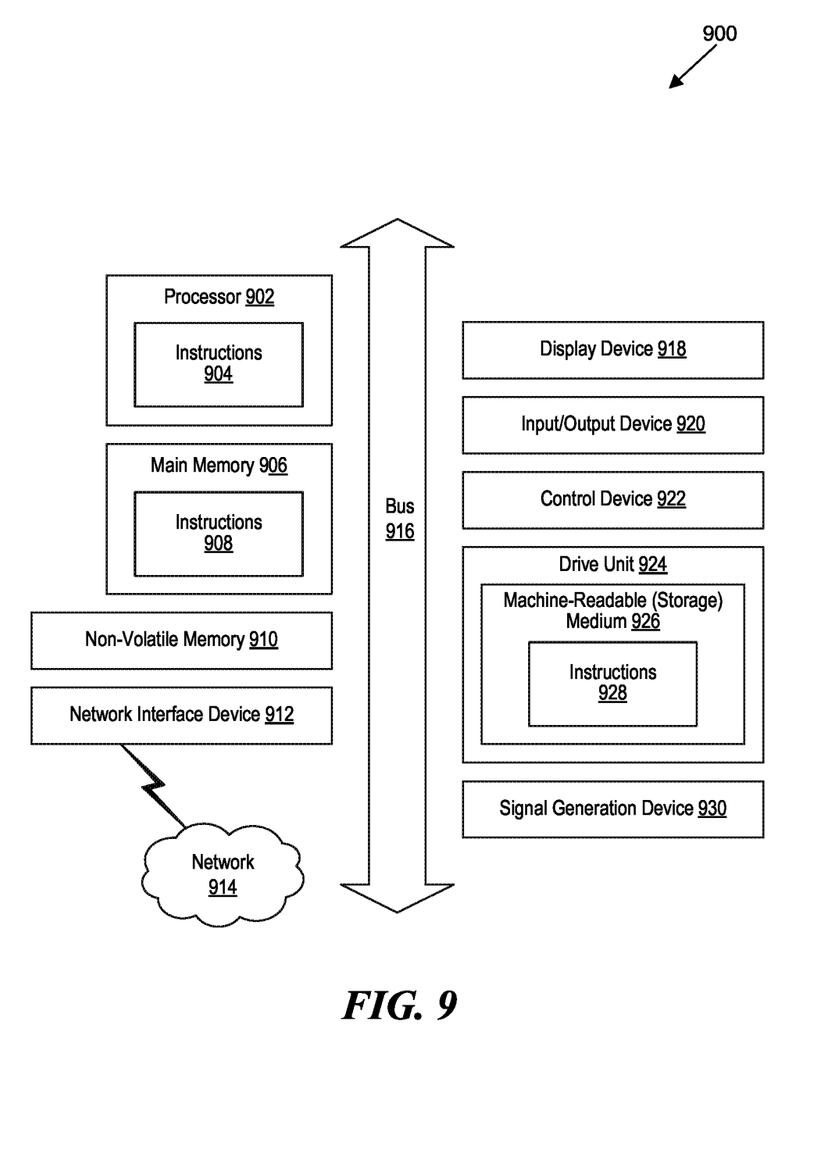
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A mobile device comprising:
   a cellular radio transceiver, configured to:
      receive data transmissions from a gNodeB, over a physical telecommunications channel, wherein at least a subset of the data transmissions include:
         user data, and
         a demodulation reference signal (DMRS);
   at least one hardware processor coupled to the cellular radio transceiver; and
   at least one non-transitory memory storing instructions, which, when executed by the at least one hardware processor, cause the mobile device to:
      generate a first channel estimate for the physical telecommunications channel based on a first DMRS received at the cellular radio transceiver, the first DMRS transmitted to the mobile device at a first number of symbol positions of an orthogonal frequency-division multiplexing (OFDM) scheme;
      demodulate a first data transmission received over the physical telecommunications channel based at least in part on the first channel estimate;
      detect a condition trigger to change a format of the DMRS to have a second number of symbol positions, different from the first number;
      in response to detecting the condition trigger, request, from the gNodeB, the DMRS with the second number of symbol positions; and
      demodulate a second data transmission received over the physical telecommunications channel based at least in part on a second channel estimate for the physical telecommunications channel that is generated using a DMRS transmitted at the second number of symbol positions.

2. The mobile device of claim 1, further comprising:
   a velocity sensor configured to output a signal indicative of a velocity of the mobile device; and
   wherein detecting the condition trigger comprises:
      measuring a velocity of the mobile device based on the signal output by the velocity sensor relative to a threshold velocity; and
      detecting the condition trigger in response to determining the velocity has crossed the threshold velocity.

3. The mobile device of claim 1, wherein detecting the condition trigger comprises one or more of:
   detecting a bit error rate of one or more of the data transmissions has crossed a threshold bit error rate;
   detecting a signal power of one or more of the data transmissions has crossed a threshold signal power level; or
   detecting a signal-to-interference-plus-noise ratio (SINR) has crossed a threshold SINR level.

4. The mobile device of claim 1, wherein the second number of symbol positions is greater than the first number of positions.

5. The mobile device of claim 1, wherein the second number of symbol positions is less than the first number of positions.

6. The mobile device of claim 1, wherein requesting the second number of positions comprises requesting one more or one less position than the first number of positions.

7. The mobile device of claim 1, wherein requesting the second number of positions comprises requesting at least two more positions than the first number of positions, or at least two fewer positions than the first number of positions.

8. The mobile device of claim 1, wherein requesting the second number of positions comprises transmitting a dedicated radio resource control (RRC) message to the gNodeB.

9. A non-transitory computer-readable storage medium, carrying instructions, which, when executed by at least one data processor of a system, cause the system to:

demodulate signals received over a physical telecommunications channel based at least in part on a first channel estimate generated using a demodulation reference signal (DMRS),
wherein the DMRS is transmitted at a first number of symbol positions;
detect a condition trigger to change a format of the DMRS to be transmitted at a second number of symbol positions, different from the first number;
in response to detecting the condition trigger, request the change to the format of the DMRS; and
demodulate signals received over the physical telecommunications channel based on a second channel estimate generated using the DMRS transmitted at the second number of symbol positions.

10. The non-transitory computer-readable storage medium of claim 9, wherein detecting the condition trigger comprises:
measuring a velocity based on an output of a velocity sensor; and
detecting the condition trigger in response to determining the measured velocity has crossed a threshold velocity.

11. The non-transitory computer-readable storage medium of claim 9, wherein detecting the condition trigger comprises one or more of:
detecting a bit error rate of one or more data transmissions has crossed a threshold bit error rate,
detecting a signal power of one or more data transmissions has crossed a threshold signal power level, or
detecting a signal-to-interference-plus-noise ratio (SINR) has crossed a threshold SINR level.

12. The non-transitory computer-readable storage medium of claim 9, wherein the second number of positions is greater than the first number of positions.

13. The non-transitory computer-readable storage medium of claim 9, wherein the second number of positions is less than the first number of positions.

14. A non-transitory computer-readable storage medium, carrying instructions, which, when executed by at least one data processor of a system, cause the system to:
transmit a first data transmission to a user equipment (UE) device via a physical telecommunications channel, the first data transmission including:
user data, and
a demodulation reference signal (DMRS) at a first number of symbol positions of an orthogonal frequency-division multiplexing (OFDM) scheme, wherein the DMRS in the first data transmission is usable by the UE device to generate a first channel estimate of the physical telecommunications channel;
detect a condition trigger to change a format of the DMRS from having the first number of symbol positions to having a second number of symbol positions; and
transmit a second data transmission to the UE device via the physical telecommunications channel, the second data transmission including the DMRS at the second number of symbol positions,
wherein the DMRS in the second data transmission is usable by the UE device to generate a second channel estimate of the physical telecommunications channel.

15. The non-transitory computer-readable storage medium of claim 14, wherein detecting the condition trigger comprises:
receiving a request from the UE device to change the format of the DMRS, wherein the request is generated by the UE device in response to detecting one or more of:
a velocity of the UE device has crossed a threshold velocity;
a bit error rate has crossed a threshold bit error rate;
a signal power has crossed a threshold signal power level; or
a signal-to-interference-plus-noise ratio (SINR) has crossed a threshold SINR level.

16. The non-transitory computer-readable storage medium of claim 15, wherein receiving the request from the UE device to change the format of the DMRS comprises receiving a dedicated radio resource control (RRC) message from the UE device, and wherein the instructions when executed further cause the system to:
transmit a dedicated RRC response message to the UE device to confirm the change to the DMRS format.

17. The non-transitory computer-readable storage medium of claim 15, wherein the instructions when executed cause the system to transmit the second data transmission to the UE device in response to receiving the request from the UE device to change the format of the DMRS.

18. The non-transitory computer-readable storage medium of claim 15, wherein the instructions when executed cause the system to transmit the second data transmission to the UE device in response to receiving a request for the DMRS that is received after the request to change the format of the DMRS.

19. The non-transitory computer-readable storage medium of claim 14, wherein detecting the condition trigger comprises one or more of:
detecting a signal power of transmissions from the UE device has crossed a threshold signal power level; or
detecting a signal-to-interference-plus-noise ratio (SINR) of transmissions from the UE device has crossed a threshold SINR level.

20. The non-transitory computer-readable storage medium of claim 14, wherein second number of positions has one more or one less position than the first number of positions.

* * * * *